United States Patent
Nakamura et al.

[11] Patent Number: 5,152,942
[45] Date of Patent: Oct. 6, 1992

[54] METHOD FOR AGGLOMERATION IN LIQUID AND APPARATUS USED THEREFOR

[75] Inventors: Masayoshi Nakamura, Tokyo; Takakatsu Takamori, Hokkaido; Masami Tsunekawa, Hokkaido; Tsuyoshi Hirajima, Hokkaido; Winston Guinto, Hokkaido; Fuminori Saga, Hokkaido; Yoshihiro Nishisu, Hokkaido, all of Japan

[73] Assignee: Showa Shell Sekiyu Kabushiki Kaisha, Tokyo, Japan

[21] Appl. No.: 834,989

[22] Filed: Feb. 14, 1992

Related U.S. Application Data

[63] Continuation of Ser. No. 761,283, Sep. 17, 1991, abandoned.

[51] Int. Cl.$^5$ .................................................. B29B 9/08
[52] U.S. Cl. .............................. 264/40.1; 23/313 R; 264/40.2; 264/117; 425/135; 425/222
[58] Field of Search .............. 264/40.1, 40.2, 117; 425/135, 222; 23/313 R

[56] References Cited

U.S. PATENT DOCUMENTS

| | | | |
|---|---|---|---|
| 3,194,758 | 7/1965 | Lissant | 23/313 R |
| 3,607,743 | 9/1971 | Visser | 210/51 |
| 3,773,536 | 11/1973 | Batten | 106/309 |
| 3,879,129 | 4/1975 | Inoue | 356/102 |
| 4,421,703 | 12/1983 | Feder | 264/68 |
| 4,737,478 | 4/1988 | Rainis | 502/8 |
| 4,758,803 | 7/1988 | Thomas | 264/40.1 X |
| 4,890,920 | 1/1990 | Niziolek | 356/336 |

FOREIGN PATENT DOCUMENTS

| | | |
|---|---|---|
| 0309155 | 3/1989 | European Pat. Off. . |
| 0382882 | 8/1990 | European Pat. Off. . |
| 2011136 | 2/1970 | France . |
| 2135263 | 12/1972 | France . |

OTHER PUBLICATIONS

Terasita, Keijiro Granulation Process and End-Point in High Speed Mixer Granulator, Yakugaku Zasshi Journal of Pharmacy) (1987), vol. 107 (5) pp. 377–383.

Primary Examiner—Mary Lynn Theisen
Attorney, Agent, or Firm—Cushman, Darby & Cushman

[57] ABSTRACT

Agglomerated particle size of ceramic materials is controlled by accurate determination of the proper final point of agglomeration. A part of a suspension in a cylindrical agitating region having agitation blades is circulated through a pipe having at least one transparent portion, the suspension which flows through the transparent pipe is irradiated with a light, preferably a laser beam and the final point of agglomeration is calculated based on the change in quantity of the transmitted light and/or the change in acoustic emission generated in the agitating region, thereby to stop the agglomeration.

11 Claims, 14 Drawing Sheets

METHOD FOR AGGLOMERATION IN LIQUID AND APPARATUS USED THEREFOR

This is a continuation of application Ser. No. 07/761,283, filed on Sep. 17, 1991, which was abandoned upon the filing hereof.

The present invention relates to a method for producing microspheres of ceramics, with a diameter less than 500 μm as uniform as possible and an apparatus used therefor.

Agglomeration is carried out in various industrial fields such as chemical, food and medicine and agglomeration conditions are set so as to meet the required specifications such as shape, size, particle size distribution and density of the agglomeration products. In the agglomeration process, the determination of the final point of agglomeration is very difficult.

In both gas phase and liquid phase agglomeration, if agglomeration operation is continued exceeding the proper final point of agglomeration, agglomeration product usually grows to a size larger than that of the specification.

On the other hand, if the agglomeration is discontinued before reaching the proper final point of agglomeration, the agglomeration product has a smaller size than the requirement or has an off-specification density.

According to the agitating granulation or the tumbling granulation which is widely employed at present, the final point of agglomeration is determined by visual observation, by carrying out sampling during agglomeration or by observing changes in electric power consumption during agglomeration operation. However, none of them are satisfactory.

The present invention provides a method of agglomeration and an apparatus used therefor. The present invention is featured with a means of determining the proper final point of agglomeration. Determination of the final point is critical, since even a few seconds change in the final point causes deviation from the desired particle size. The first invention relates to a method of agglomeration in liquid for the preparation of ceramic microspheres using light attenuation for determining the final point of agglomeration. The method comprises of suspending feedstock powder (a) in liquid (b) having non-affinity for the feedstock powder, optionally adding to the suspension a bridging liquid immiscible with the liquid (b) and having affinity for the feedstock powder (a) and agitating the suspension in a cylindrical type internally agitating region having rotating agitation blades. A part of the suspension in said agitating region is circulated through a pipe having at least one transparent portion. The suspension flowing through the transparent pipe is irradiated with light (desirably laser beam), and the final point of agglomeration is calculated based on the change in the intensity of transmitted light. Agglomeration is stopped at the calculated final point.

The second embodiment relates to a method of agglomeration in liquid for the preparation of ceramic microspheres using acoustic emission for determining the final point of agglomeration. The method comprises of suspending feedstock powder (a) in liquid (b) having non-affinity for the feed-stock powder, optionally adding to the suspension a bridging liquid immiscible with the liquid (b) and having affinity for the feedstock powder (a) and agitating the suspension in a cylindrical internally agitating region having rotating agitation blades. Changes in acoustic emission (hereinafter referred to as "AE") which occur in the agitating region are measured to calculate the final point of agglomeration and the agglomeration is stopped.

The third embodiment relates to a method of agglomeration in liquid for the preparation of ceramic microspheres using light attenuation and AE. The method comprises of suspending feedstock powder(a) in liquid (b) having non-affinity for the feedstock powder, optionally adding to the suspension a bridging liquid immiscible with the liquid (b) and having affinity for the feedstock powder(a) and agitating the suspension in a cylindrical type internally agitating region having rotating agitation blades. A part of the suspension in said agitating region is circulated through a pipe having at least one transparent portion, the suspension flowing through the transparent pipe is irradiated with light (desirably laser beam), and change in intensity of transmitted light is measured. In addition, change in AE generated in the agitating region is measured and the final point of agglomeration is calculated based on both changes, and the agglomeration is stopped.

The fourth embodiment relates to an apparatus for agglomeration in liquid which comprises of cylindrical vessel having rotating agitation blades, a pipe which connects one end of the vessel to another end and has at least one transparent portion, a light (desirably laser beam) irradiator and a light receptor which are set on both sides of the transparent pipe and a control mechanism which calculates a final point of agglomeration based on a time for stopping the rotating agitation blades by the change in intensity of light received by the light receptor and stops rotation.

The fifth invention relates to an apparatus for agglomeration in liquid which comprises of cylindrical vessel having rotating agitation blades, a device which detects AE generated in the cylindrical vessel and a device which measures change of AE and a control mechanism which calculates the time for stopping the rotating agitation blades by the change in AE detected by above measuring device and instructs the stopping of rotation.

The sixth embodiment relates to an apparatus for agglomeration in liquid which comprises of cylindrical vessel having rotating agitation blades, a pipe which connects one end of the vessel to another end and has at least one transparent portion, a light (desirably laser beam) irradiator and a light receptor which are set on both sides of the transparent pipe, a device which detects AE generated in the cylindrical vessel, a device which measures change of the AE and a control mechanism which calculates the time for stopping the rotating agitation blades based on the change in intensity of light received by the light receptor and the change in AE detected by the above measuring device and instructs stopping of rotation.

The change of AE can be known by measuring at least one of the following: (1) AE average, (2) Event total (total number of event generated), (3) Event rate (rate of event generation), (4) Oscillation rate (rate of generation of oscillation), (5) Envelope, (6) Average, and (7) Energy rate (rate of energy).

Figure 3:
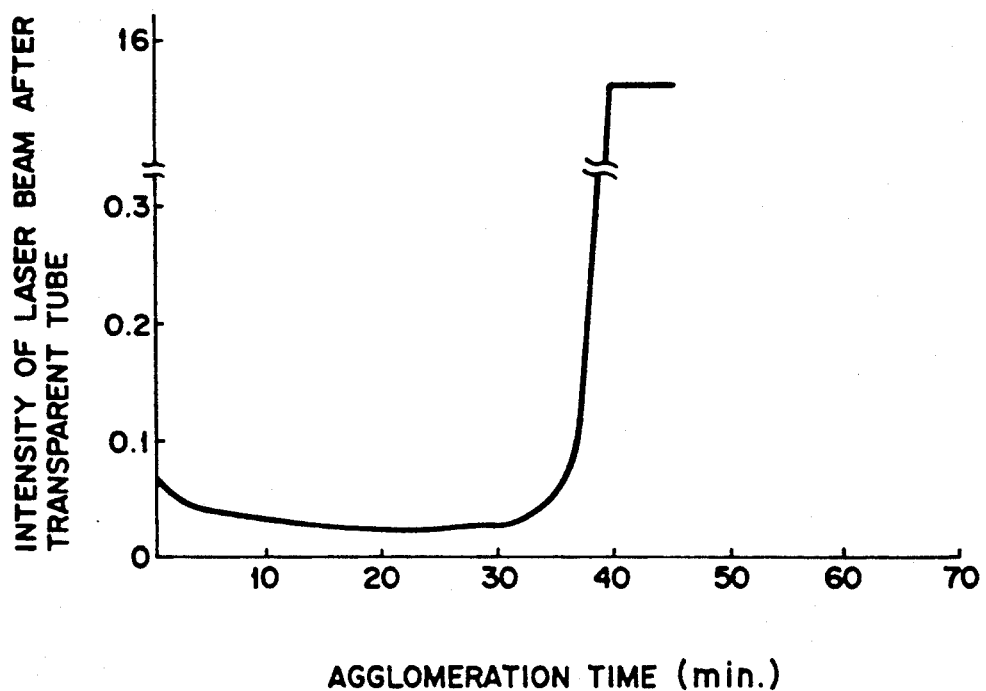

FIG. 3 is a graph which shows the change with time of laser beam intensity transmitted through the transparent pipe. In this FIG. 3 and the following graphs which show change with time, the graphs are shown as smooth curve, but actually, there are some fluctuations. The smooth curve represents the average value of these changes.

Figure 4:
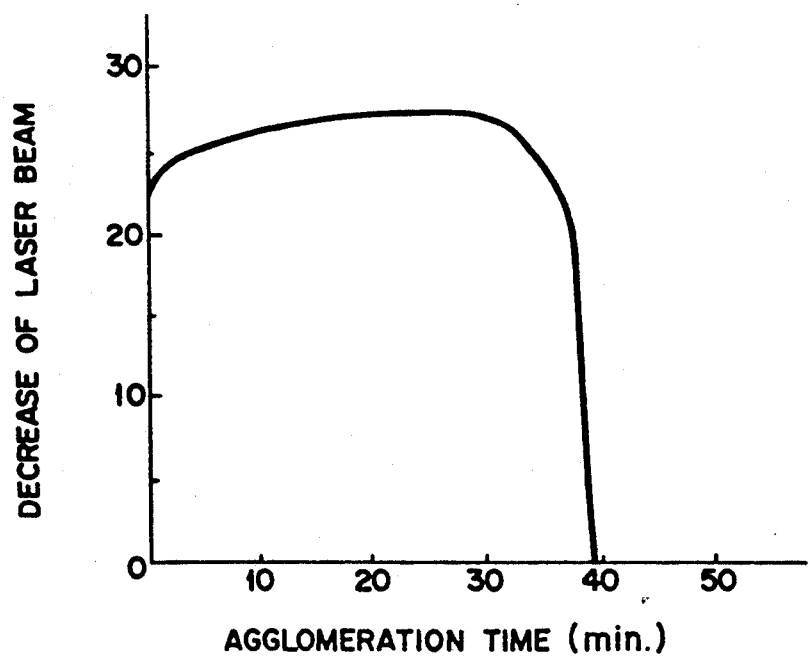

FIG. 4 is a graph which shows change with time of laser beam attenuation.

Figure 5:
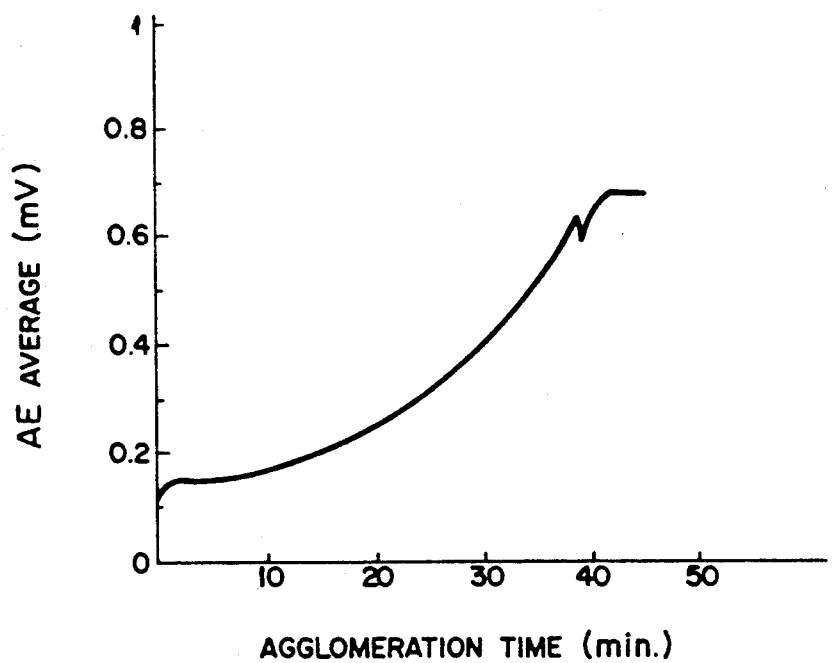

FIG. 5 is a graph which shows change with time of AE average value.

Figure 6:
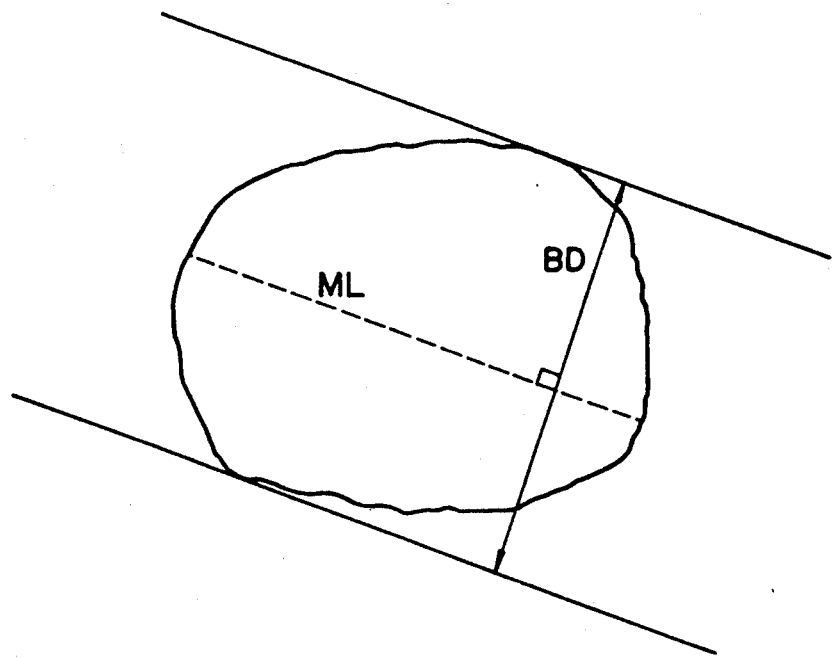

FIG. 6 shows maximum length (ML) and breadth diameter (BD) which are necessary for calculation of shape factor of sphere.

Figure 7:
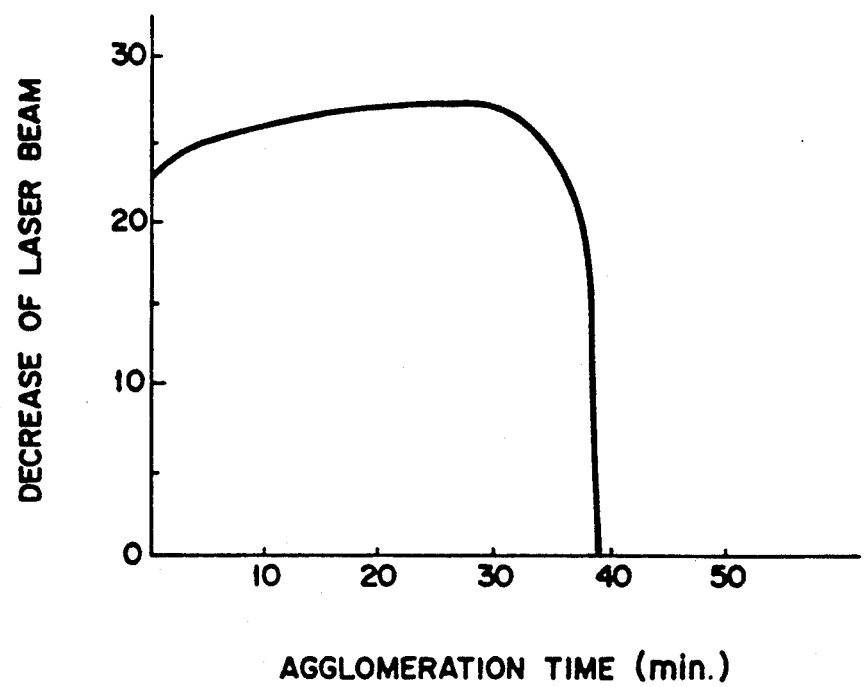

FIG. 7 is a graph which shows change with time of laser beam attenuation in Example 1.

Figure 8:
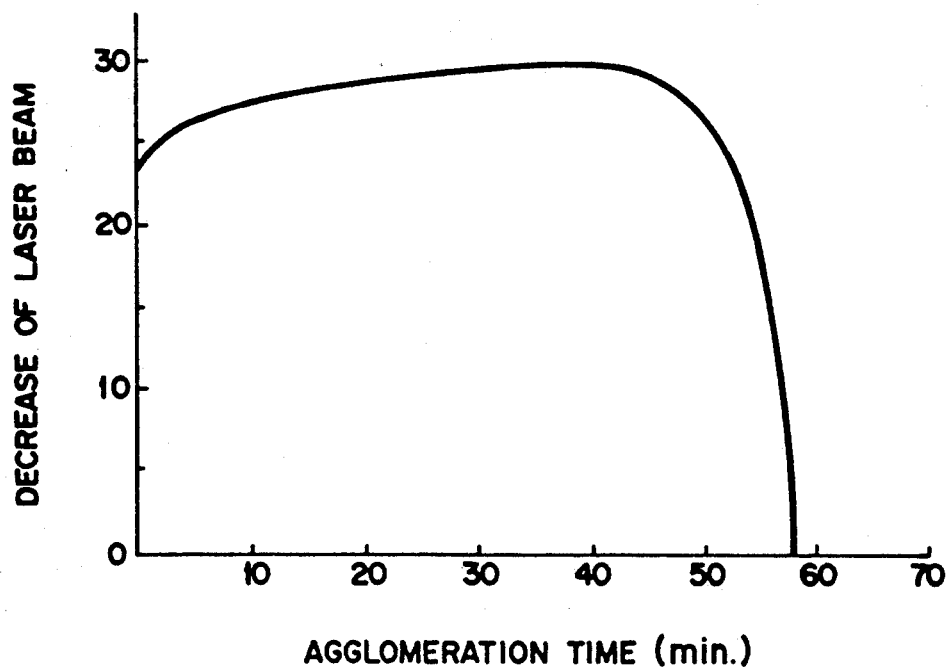

FIG. 8 is a graph which shows change with time of laser beam attenuation in Example 2.

Figure 9:
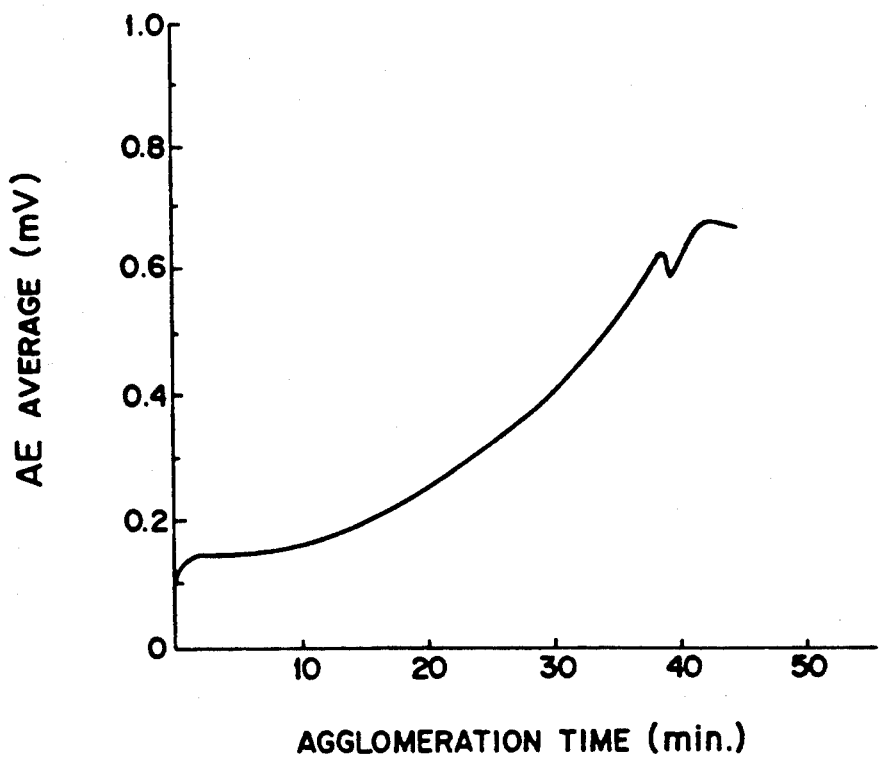

FIG. 9 is a graph which shows change with time of AE average in Example 3.

Figure 10:
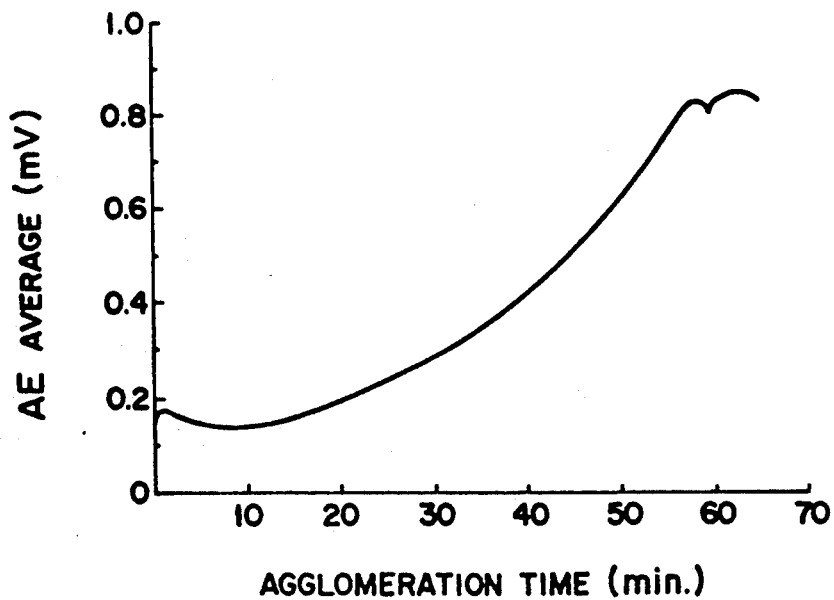

FIG. 10 is a graph which shows change with time of AE average in Example 4.

Figure 11:
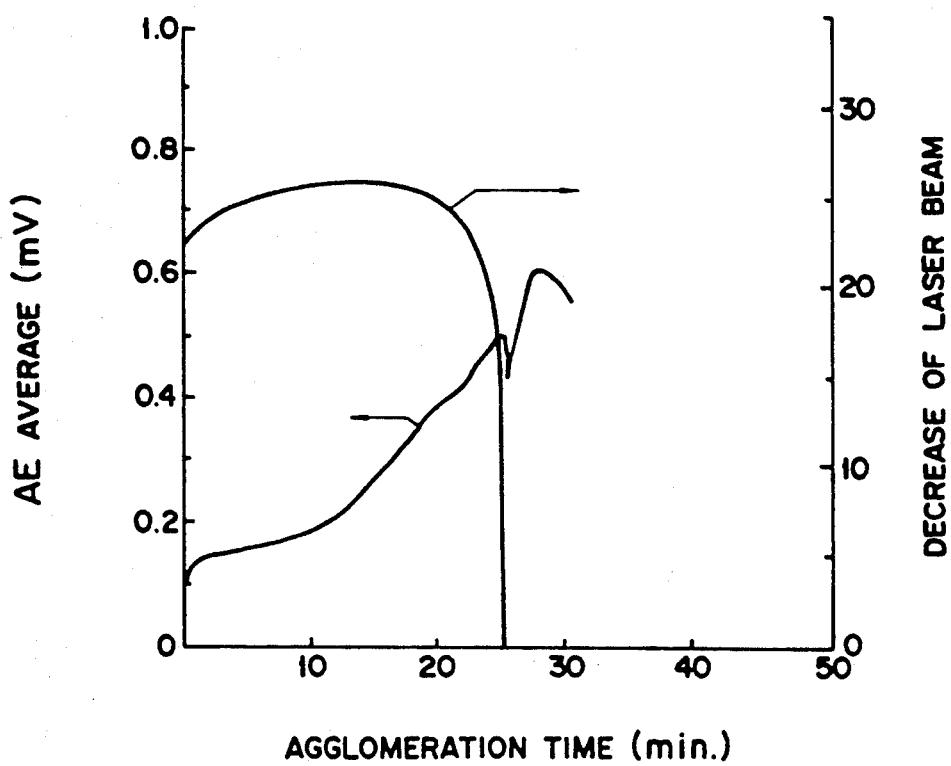

FIG. 11 is a graph which shows changes with time of laser beam attenuation and AE average in Example 5.

Figure 12:
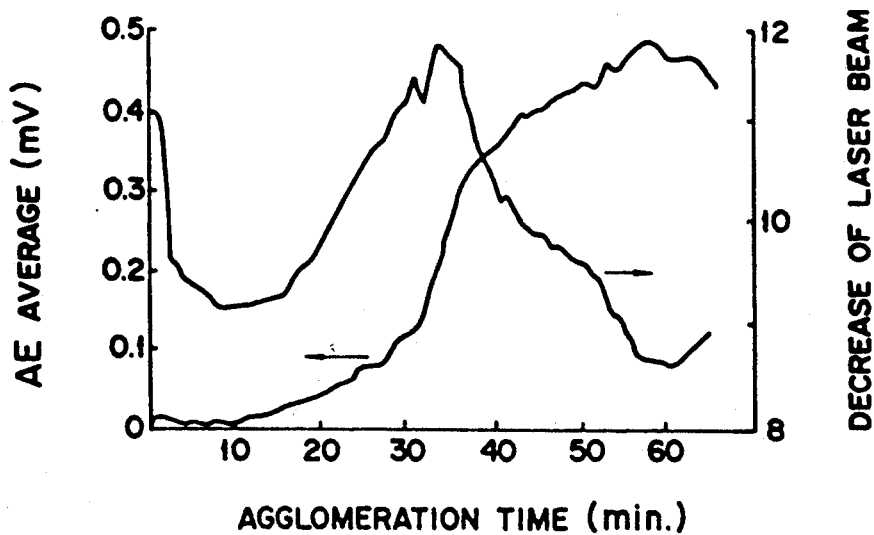

FIG. 12 is a graph which shows changes with time of laser beam attenuation and AE average in Example 6.

Figure 13:
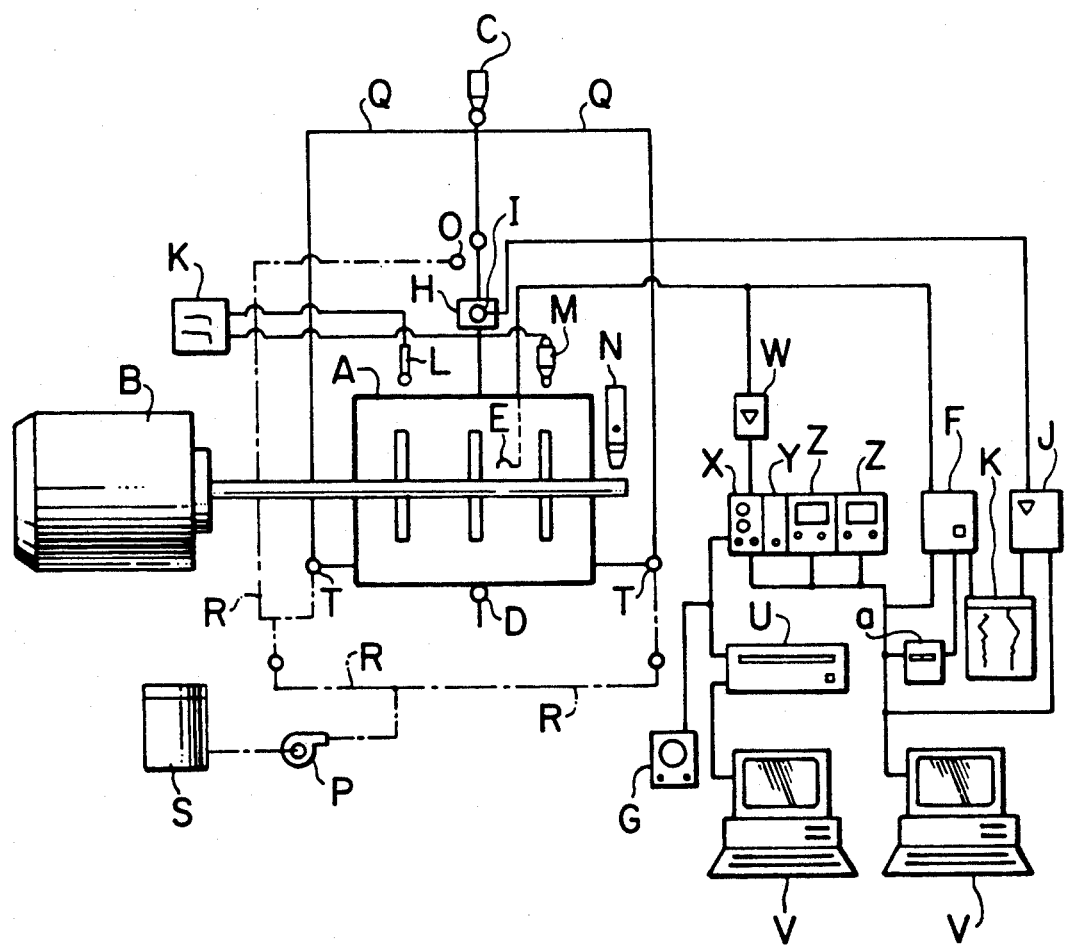

FIG. 13 is a front view of another apparatus of the present invention.

Figure 14:
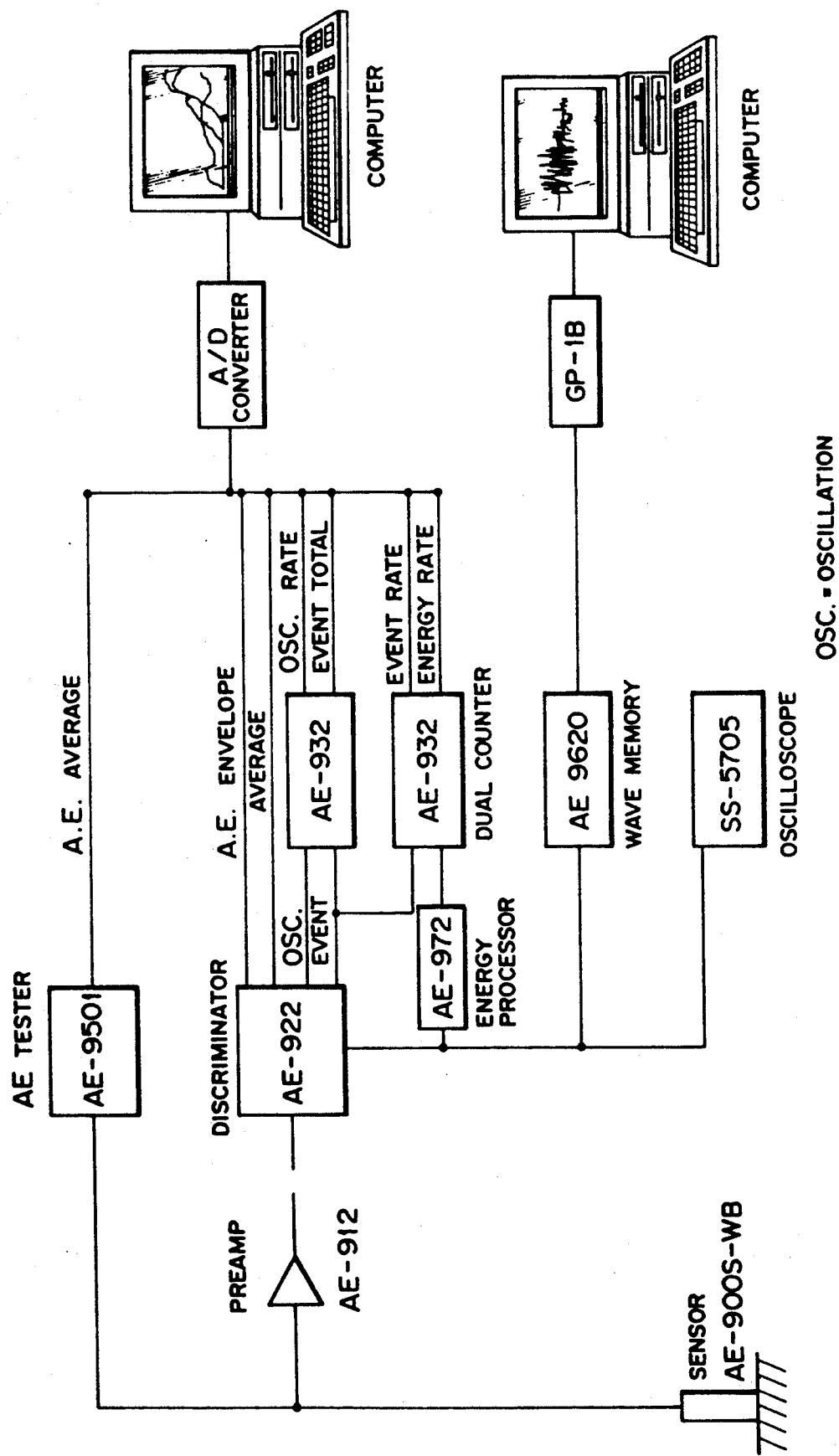

FIG. 14 is a system diagram which shows AE measurement system according to the present invention.

Figure 15:
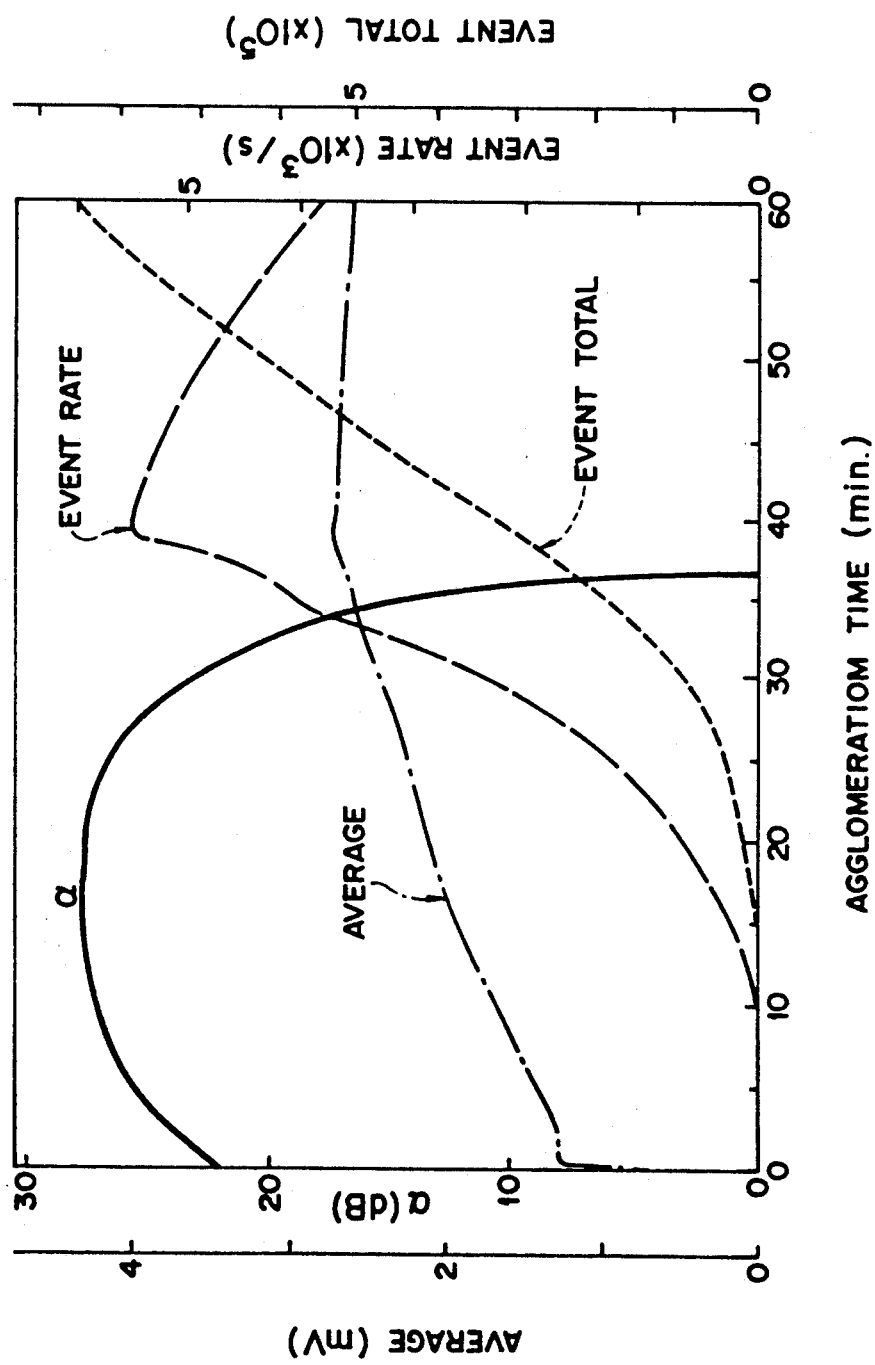

FIG. 15 is a graph which shows changes with time of laser beam attenuation ($\alpha$) and event total, laser beam attenuation and event rate, and laser beam attenuation and average in Example 7.

Figure 16:
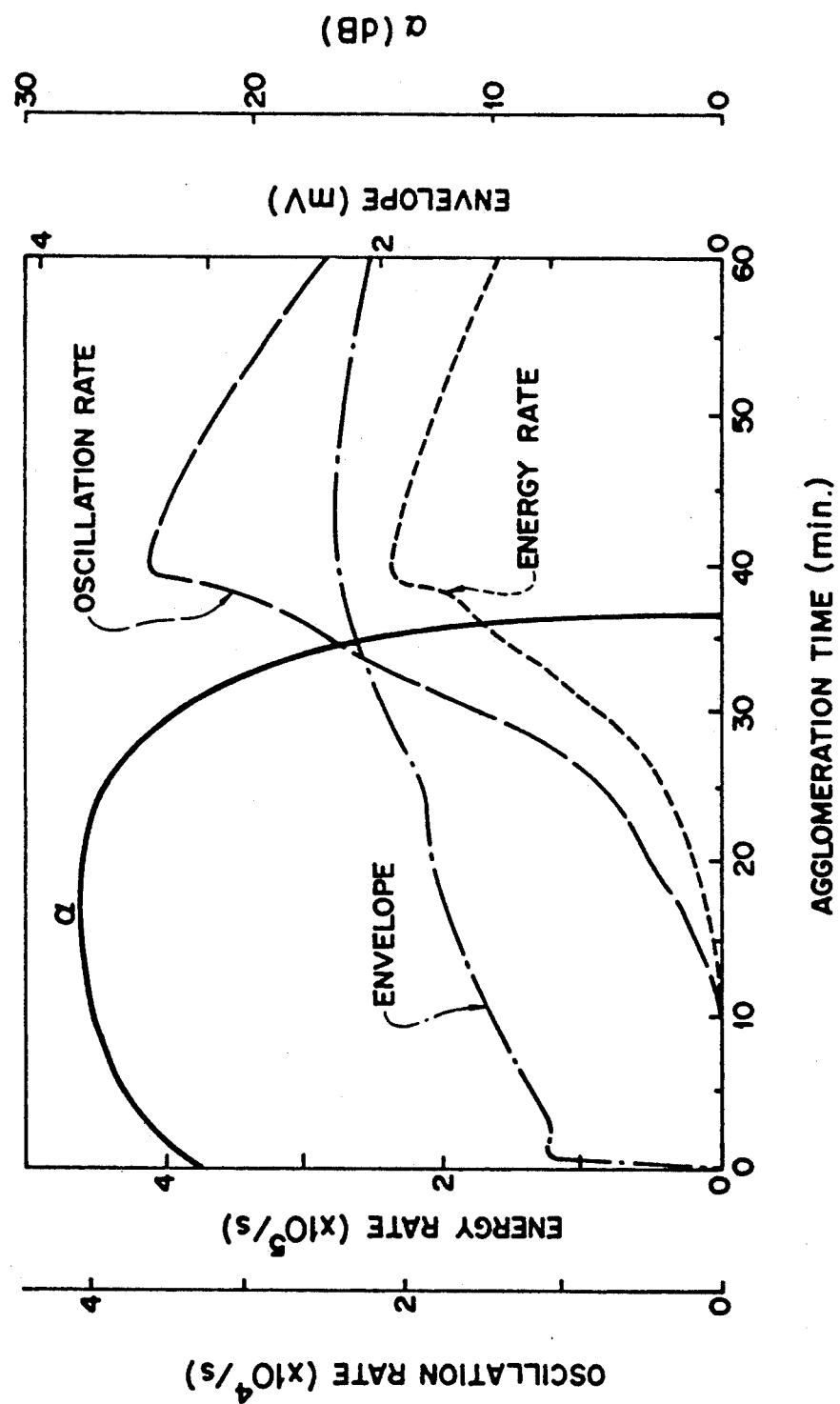

FIG. 16 is a graph which shows changes with time of laser beam attenuation and energy rate, laser beam attenuation and envelope, and laser beam attenuation and oscillation rate in Example 7.

Figure 17:
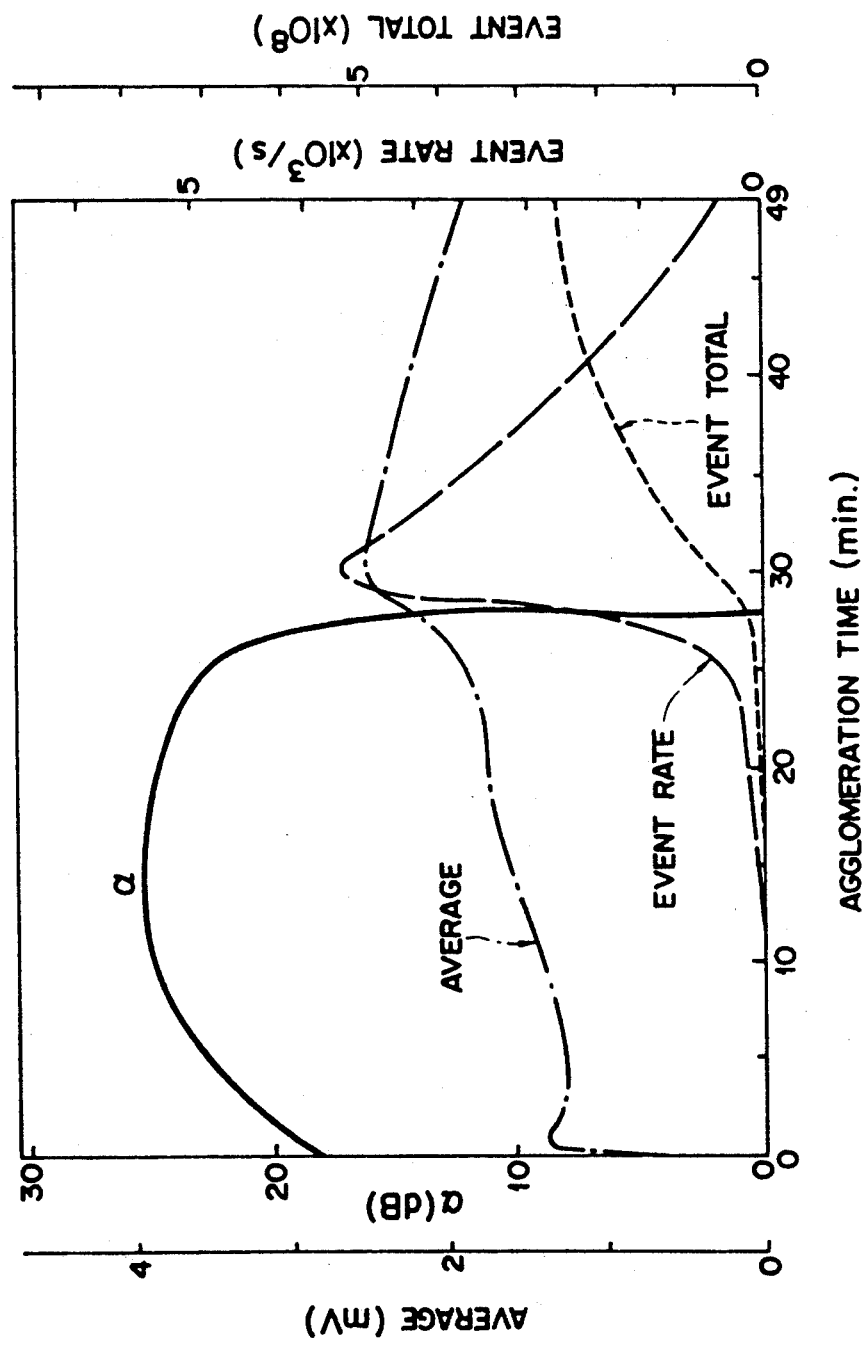

FIG. 17 is a graph which shows changes with time of laser beam attenuation and event total, laser beam attenuation and event rate, and laser beam attenuation and average in Example 8.

Figure 18:
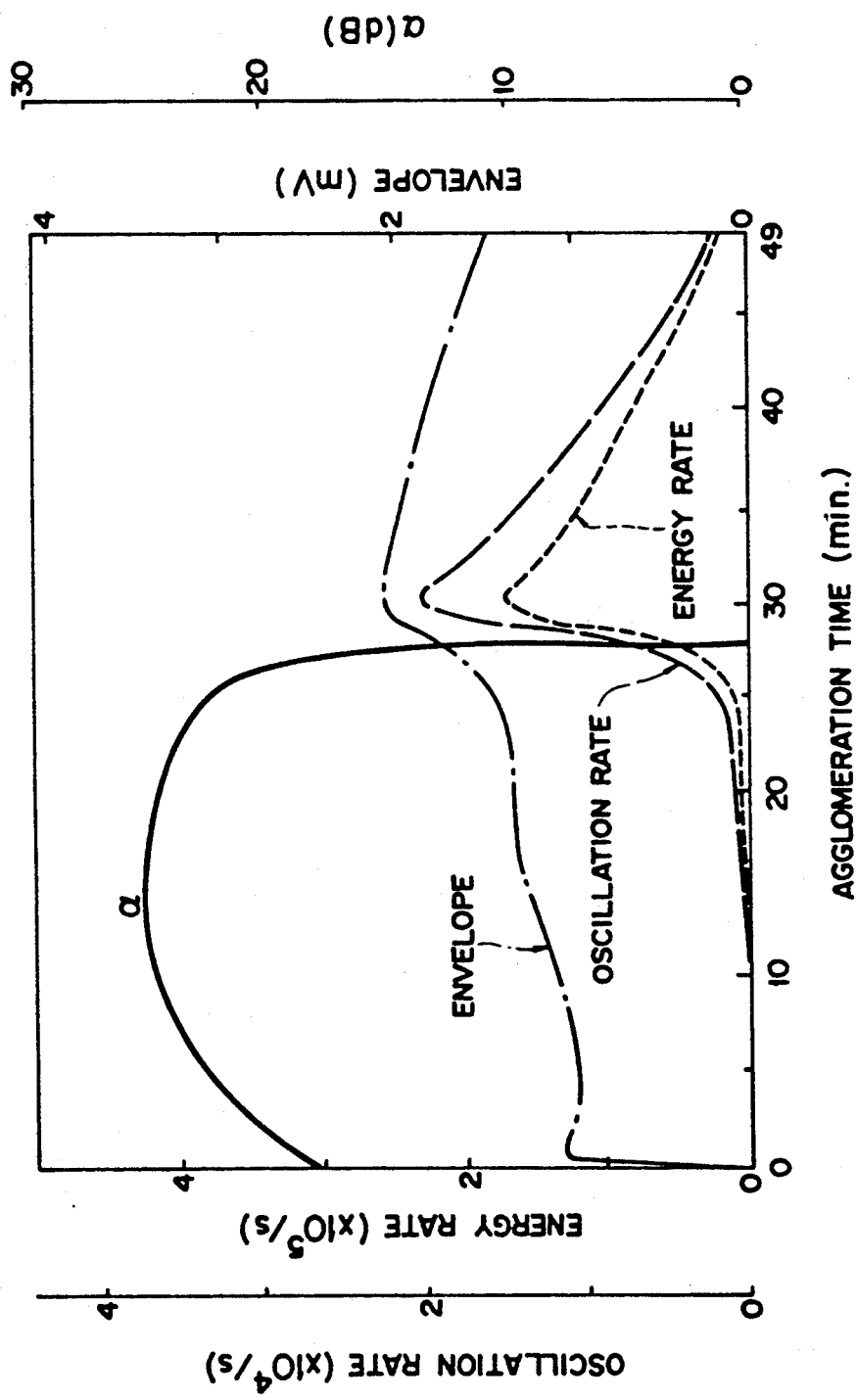

FIG. 18 is a graph which shows changes with time of laser beam attenuation and energy rate, laser beam attenuation and envelope, and laser beam attenuation and oscillation rate in Example 8.

Figure 19:
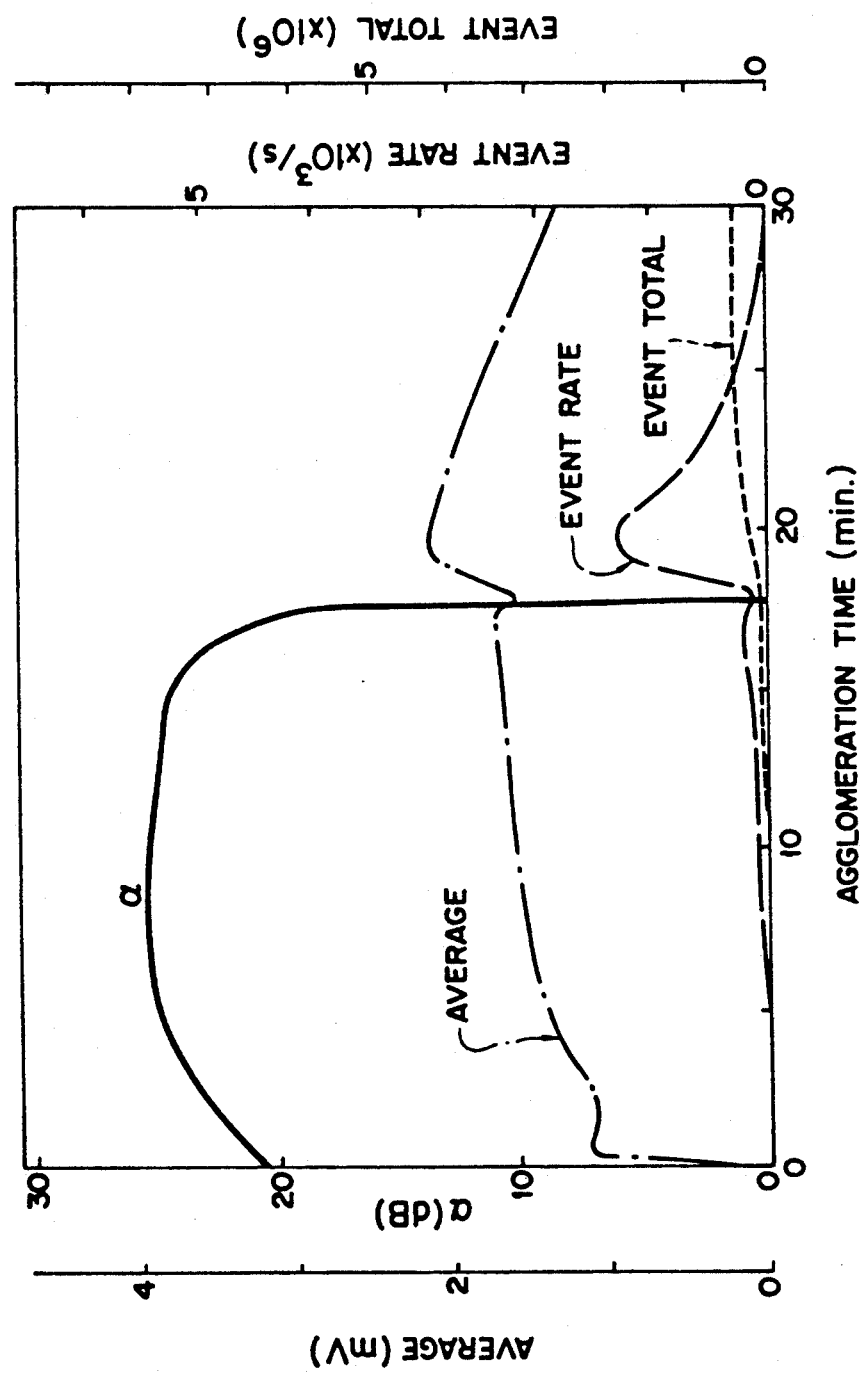

FIG. 19 is a graph which shows changes with time of laser beam attenuation and event total, laser beam attenuation and event rate, and laser beam attenuation and average in Example 9.

Figure 20:
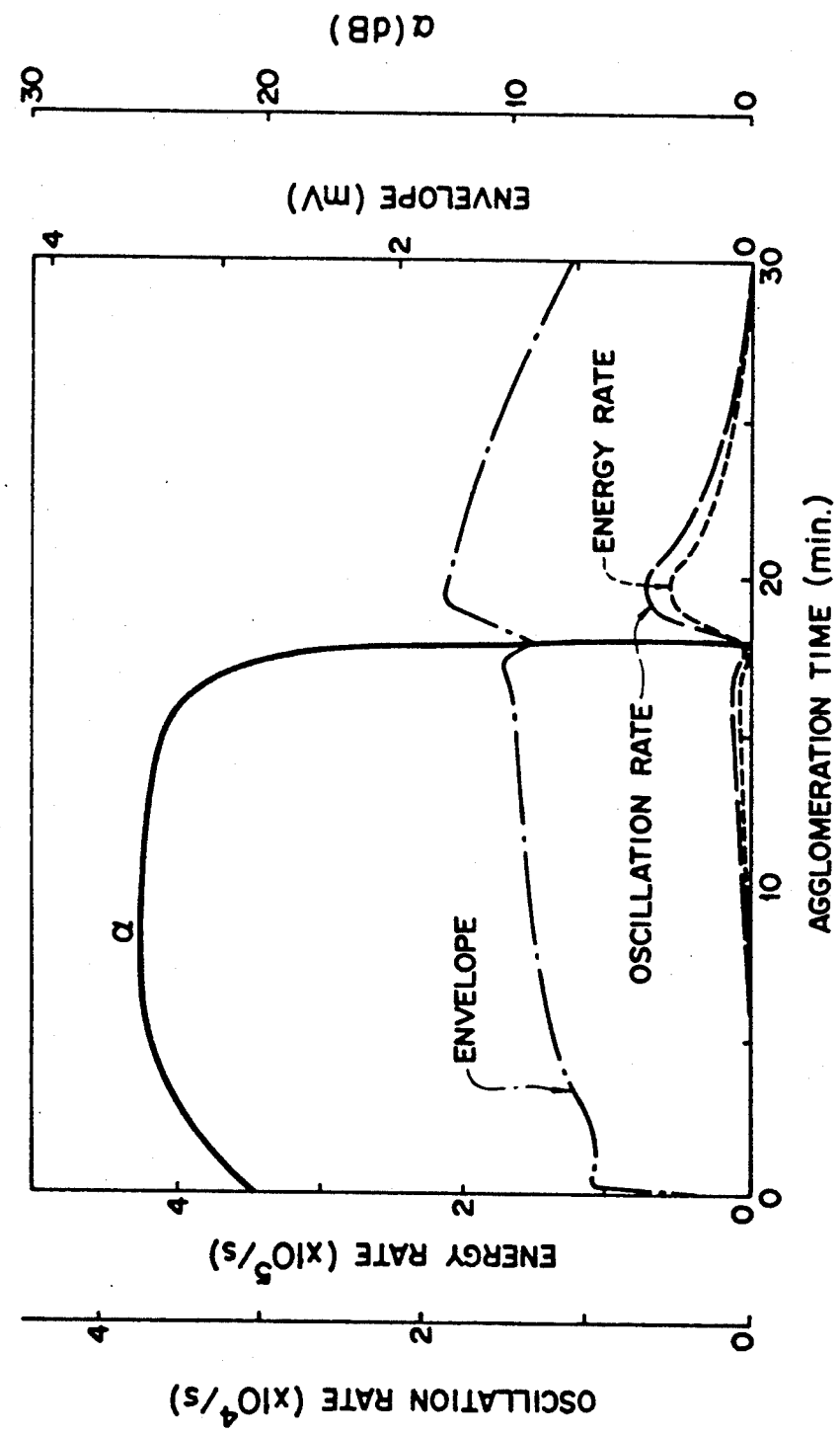

FIG. 20 is a graph which shows changes with time of laser beam attenuation and energy rate, laser beam attenuation and envelope, and laser beam attenuation and oscillation rate in Example 9.

The method of agglomeration in liquid of the present invention can be applied to both agglomeration in water and agglomeration in oil.

(1) Agglomeration in oil

Agglomeration in oil includes two methods in a broad sense. One of them uses aliphatic hydrocarbons, aromatic hydrocarbons or mixtures thereof as a suspending medium. More specifically, an example is the agglomeration which is carried out in relatively gentle agitation region using aliphatic hydrocarbons such as hexane as a suspending medium without adding a bridging liquid. It is considered that in the above agglomeration method, the small amount of water present in the suspending medium and in the powder feedstock acts as a bridging liquid.

In another one method, aliphatic hydrocarbons, aromatic hydrocarbons or mixtures thereof are used as the suspending medium as in the above method. More specifically one example is the method which is carried out in a relatively intensive agitation region using aliphatic hydrocarbons containing isoparaffin as a suspending medium with addition of a small amount of a bridging liquid.

The bridging liquid added includes, for example, water, polyvinyl alcohol and cellulose derivatives. Amount of the bridging liquid is usually 5-25% by weight, preferably 8-13% by weight based on the solid matter in the suspension.

In order to obtain particles of uniform size, it is necessary to adjust the agitating conditions so that the bridging liquid can be uniformly dispersed and evenly collide with fine suspended particles. For this purpose, it is preferred that a very small amount of a surface active agent is added to the bridging liquid. This bridging liquid is mixed with and dispersed in an organic solvent which constitutes the suspension.

The surface active agent may be cationic, anionic or nonionic surface active agents which are generally used.

(2) Agglomeration in water

This must be carried out after the surface of ceramic feedstock powder has been made hydrophobic. As an example of an agent for making the powder surface hydrophobic, higher fatty acid salts, higher alkylsulfates or higher alkylamine salts may be used. Preferred are sodium oleate, sodium dodecylsulfate, dodecylammonium acetate, and so on.

After a small amount of the bridging liquid is added to the suspension of ceramic powder which has been made hydrophobic with the above agents, agglomeration is carried out.

As the bridging liquid, hydrocarbons can be used. Preferable hydrocarbons are petroleum or coal hydrocarbons of $C_8-C_{18}$. More preferred are mixtures of petroleum hydrocarbons of $C_8-C_{12}$.

Outline of the agglomeration in water will be explained below.

A given amount of ceramic feedstock powder and a given amount of water are introduced into the agglomeration apparatus and agitated to form a suspension of the ceramic powder, to which a given amount of the hydrophobicity-imparting agent is added, followed by agitating for a given time to make the ceramic powder hydrophobic. The water used here is adjusted to an optimum pH depending on the kinds of ceramic powder and the hydrophobicity-imparting agent. That is, it is preferred that when a fatty acid salt is used as the hydrophobicity-imparting agent, water is adjusted from weakly acidic state to weakly alkaline state. When a higher alkylsulfate is used, water is adjusted to a pH in the acidic range and when a higher alkylamine salt is used, water is adjusted to a pH in the alkaline range.

Then, a given amount of the bridging liquid is added and agitation is further continued to perform agglomeration.

Ceramics, especially fine ceramics which can be made into microspheres by the method of agglomeration in liquid according to the present invention include zirconia, alumina, mullite, silicon nitride, silicon carbide, barium titanate, magnesium oxide, and the like.

Amount (concentration) of the ceramic powder suspended in the organic solvent or water is not critical, but preferably concentration of solid matter in the suspension is 1.5-30% by weight.

The pipe through which the suspension is circulated for light attenuation measurement can be anything as far as the portion which is irradiated with light is transparent. Materials of the pipe may be anything as far as they do not contaminate the suspension. As transparent materials, mention may be made of glasses and synthetic resins. Especially, polyvinyl chloride pipe is inexpensive and practical. The internal diameter of the pipe is not critical, but usually 5-20 mm is preferred.

Flow velocity of the particles in the suspension which flow through the pipe is determined depending on the speed of the rotating agitation blades.

One example of the present invention will be explained on agglomeration in oil with addition of the bridging liquid referring to the drawings.

Figure 1:
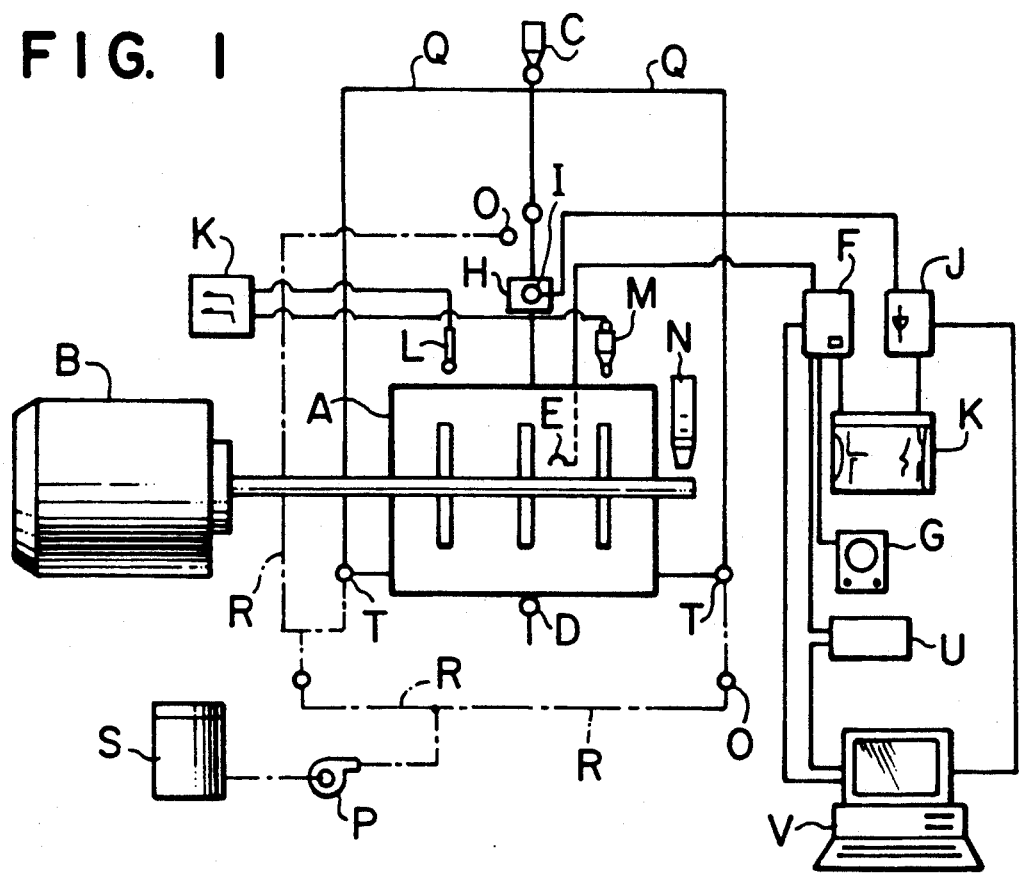
FIG. 1 is a front view of an apparatus of the present invention.
Figure 2:
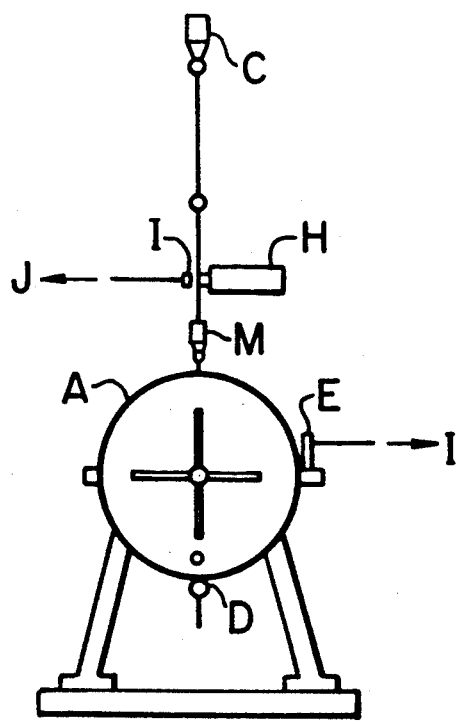
FIG. 2 is a side view of the apparatus shown in FIG. 1.

As shown in FIGS. 1 and 2 (the portions relating to AE are not needed in the first and fourth inventions), the feedstock powder (such as zirconia) are mixed with oil which is an organic solvent and is fed in suspended state from feed opening (C) into cylindrical vessel (A). After completion of pouring, a bridging liquid is added. This addition of the bridging liquid is carried out by injecting it directly from a syringe into the agglomeration vessel through a needle inserted in the side part of the vessel. The valve connected to the feed opening is closed and the suspension is agitated by the rotating agitation blades. Simultaneously with the start of agitation, the suspension flows upward through the transparent pipe between laser beam generator (H) and light receptor (I) as shown in FIG. 2. The flow is divided into two by the T joint underneath the feed opening (C) and returns into the agitating vessel through the by-pass line (Q) through valve (T). The suspension is circulated through these pipes during the agglomeration.

The suspension which passes through the transparent pipe is irradiated with laser beam emitted from laser beam emitter (H) and received by receptor (I) as shown in FIG. 2 and the signal is amplified by amplifier (J) and recorded in recorder (K).

Simultaneously with driving of the rotating agitation blades, acoustical signal are emitted which actuates the AE sensor (E). The signal from the sensor is routed to the AE tester (F) for measurement.

As shown in FIG. 3, change with time of the intensity of laser beam transmitted through the suspension in the transparent pipe gradually decreases after the start of agglomeration, begins to increase gradually at a certain value and thereafter exponentially increases and stabilizes when it reached the value near to that value only the suspending medium was present. It has been known that attenuation of the laser beam transmitted through the suspension decreases with the decrease in number of suspended particles. The solid concentration does not change and the change in size of the agglomerates, i.e. growth, effectively decreases the number of suspended particles and in turn decreases the amount of attenuation of the laser beam. Based thereon, the final point of agglomeration is determined by the quantity of laser beam which transmits through the suspension in the transparent pipe. Attenuation of laser beam due to the solid particles in the suspension is obtained by calculating the ratio of the intensity of the incident beam to the intensity of the beam transmitted through the suspension from the following formula.

Attenuation of laser beam $= -10 \times \log(I/I_0)$ $I$—Quantity of light transmitted through the suspension.

$I_0$—Quantity of light transmitted through the suspending medium only without solid particles.

As shown in FIG. 2, the laser beam which has been emitted from laser beam emitter (H) transmits through the transparent pipe and then is converted to electric signal at receptor (I) and amplified at amplifier (J) and thereafter, is recorded in recorder (K). This value is the intensity of laser beam in FIG. 3. Thereafter, attenuation of laser beam as shown in FIG. 4 is obtained by the above formula and it shows that at the time when the attenuation of laser beam reaches 0 or a value which is close to 0, no fine particles or flocs are present in the agglomerating apparatus and all have become agglomerates except a slight amount of materials sticking to the wall of the agglomerating apparatus or the surface of rotating agitation blades. The time elapsing for a certain period from the time when the attenuation of laser beam reaches 0 or close to 0 is taken as the final point of agglomeration. This certain period is determined by diameter, density and sphericity of agglomerates as required values, and is usually a few minutes to ten and a few minutes. Based on this final point of agglomeration, electric power switch for driving agitation blades is controlled using computer (V).

In FIGS. 1 and 2, a horizontal type of the cylindrical vessel is shown, but of course, the vessel may be of vertical, horizontal and slant type.

Next, explanation will be given on a method to determine the final point of agglomeration from the change with time of AE generated in the agglomerating vessel in the course of formation and growth of agglomerates.

The change of AE includes (1) AE average, (2) event total, (3) event rate, (4) oscillation rate, (5) envelope, (6) average, and (7) energy rate. FIG. 14 shows an AE measuring system which measures these AE and methods for determination of the final point of agglomeration from respective changes of AE will be explained in sequence.

(1) AE average

As shown in FIG. 1 (the parts relating to laser beam are not needed in the second and fifth inventions), AE signal obtained by AE sensor (E) attached on the side wall of the agglomerating vessel is processed by AE tester (F) and "AE average value" which is the output of the processed signal is recorded by recorder (K) and computer (V) and change thereof with time is obtained. The "AE average value" shows a value of direct current (pulsating flow) obtained by half-wave rectification of an input signal and averaging thereof and is called simple type of envelope and is outputted in the following manner. That is, AE signal received by the sensor is inputted in AE tester and is amplified by amplifier and passed through a high-pass filter. This is RF output (output of amplified AE signal). This RF signal is half-wave rectified by an average detecting circuit and is outputted as value of direct current (pulsating current) which is the average of the half-wave rectified RF signal. As can be seen from FIG. 5, the AE average value increases at the starting of agglomeration and sharply decreases after reaching a peak. Then, it again increases and decreases after reaching a second peak. That is, it has become clear that the AE average value has two peaks and one descending point. It has also been confirmed that reproducibility thereof is much superior. This descending point is considered to be a point where complete agglomeration is attained. This descending point almost coincides with the point at which laser beam attenuation reaches 0 as shown in FIG. 4. The time at which a given period has elapsed after the AE average value reached this descending point is taken as the final point of agglomeration and electric power switch for driving the agitation blades is controlled by instructions of computer (V) based on the final point.

AE signal processing

Method for quantifying the changes in AE includes the formats (1)–(7) as mentioned above, but only the format (1) can be applied to the apparatus shown in FIGS. 1 and 2.

However, if the apparatus of FIG. 1 is replaced with that of FIG. 13 (sectional view is the same as of FIG. 2), any of the formats (1)–(7) can be employed.

The apparatus of FIG. 13 is identical with that of FIG. 1 in the main body of agglomerating device, but differs in the measuring part of the right half portion of FIG. 1.

That is, simultaneously with driving of rotating agitation blades, AE sensor (E), AE tester (F) which is said to be a simple type measuring device for AE, universal counter (a), pen recorder (K), and computer (V) are actuated. Simultaneously, the usual AE measuring device can be actuated which comprises AE preamplifier (W), discriminator (X), energy processor (Y), dual counter (Z), and computer (V) connected with wave memory (U).

Next, AE measuring system will be explained using FIG. 14.

The signal received by AE sensor (AE-900S-WB in FIG. 14) is inputted in AE tester (AE-9501 in FIG. 14). The signal is subjected to erasion of mechanical noise by HPF of 100 kHz (high pass filter which removes signals of frequency of less than 100 kHz), is attenuated to 3/10 by an attenuator, and then is amplified to a certain level by an amplifier in accordance with the gain (amplification factor) setting. This is the RF (radio frequency) output. The output of amplifier is inputted to average detecting circuit and a comparator with a 100 mV threshold value. This RF signal is subjected to half-wave rectification in the average detecting circuit and is outputted as direct current (pulsating current). This is AE average, which is output as AE average by carrying out a series of the above measuring operations in tester AE-9501 and subjected to analog/digital conversion and inputted in the computer.

Measurements of AE values other than AE average will be explained by the measuring system of FIG. 14.

A signal obtained by AE sensor is inputted in discriminator (AE-922 in FIG. 14) through the preamplifier (gain, namely, amplification factor is 40 dB). The input signal enters into HPF (high pass filter) and then is inputted in LPF (low pass filter). In this measurement, HPF is set at 100 kHz and LPF is not used. The signal which has passed the filter is attenuated by a 10 dB stepwise variable attenuator and is inputted with a 0–40 dB range in main amplifier. The main amplifier is composed of a series of three amplifiers of 20 dB and the latter two always operate, but the first amplifier is inserted only when ranges of 50, 60 dB are selected. Gain of the discriminator can be set in the range of −20 to 60 dB by the combination of above attenuator. In this measurement, gain is set at 20 dB. RF signal output from the main amplifier enters into an envelope detector and a zero-cross comparator having a threshold value of 0 (when the RF signal is inputted in the comparator, it is reduced to 1/5). The signal which is inputted in the envelope detector is subjected to half-wave rectification and smoothed by allowing it to have a fine constant when falling and thereafter is outputted as envelope. Furthermore, 1/5 signal of envelope output is supplied to an averaging circuit and VH (high level) and VL (low level) comparator.

The signal which is output from averaging circuit is made fivefold and thereafter is outputted as an average. The signal which has been converted digitized VH and VL comparators is outputted as event signal and NG (no good) signal by control circuit. In this apparatus, discrimination level is set at two of VH and VL and when the input signal (envelope) exceeds VH, event signal is outputted until the signal decreases to less than VL. This is measured as 1 event. Unless Tw which is duration time of 1 event satisfies Tmin<Tw<Tmax (Tmin and Tmax are two times which have been previously set), NG signal is outputted at the end of the event signal and the event signal is not measured by the counter. In this measurement, the following are set: VH =0.7 V, VL=0.68 V, Tmin=10 μsec, and Tmax=100 msec.

The RF signal which is inputted in the zero-cross comparator is converted to pulse (oscillation). This pulse is outputted only in the period during which the event signal is outputted. Among the signals which have been outputted from the discriminator, the envelope and the average are recorded in the computer through A/D converter and the RF signal is supplied to energy processor (which outputs pulse train proportional to energy) of AE-972 in FIG. 14, oscilloscope (used for observation of AE wave) of SS-5705 in FIG. 14, and wave memory device of AE9620 in FIG. 14. The event signal and the pulse are supplied to dual counter (two channel counter of 8 figures) of AE932 in FIG. 14. AE wave taken in the wave memory device is inputted in the computer through a 6P-IB interface board (FIG. 14).

The signal supplied to the energy processor was subjected to energy analyzing process and converted to a pulse of frequency proportional to the energy. The energy analyzing process is carried out by squaring the amplified input signal by a multiplier, averaging the squared signal, then amplifying it to necessary level and converting the amplified signal to a pulse of frequency proportional to the energy by a V-F converter. The converted signal is transmitted to the dual counter. In this measurement, two dual counters are used. In the first counter the oscillation and event signals from the discriminator are inputted. The oscillation signal is outputted as an oscillation rate by measuring the input signal at an interval of a certain time (1 second in this measurement). The event signal is measured by leaving the gate of counter open and is outputted as an event total. The oscillation rate and the event total are both recorded in computer through an A/D converter.

In the other dual counter, the event signal and the pulse signal from the energy processor are inputted. Values of input signals measured every 1 second are respectively outputted as event rate and energy rate, which are recorded in the computer through the A/D converter.

Furthermore, when NG signal is sent from the discriminator, the event signal is disregarded by the event total and the event rate counters.

(2) Event total

AE measurement is carried out in the order of detection, pre-processing and analysis. AE is detected by AE sensor and is converted to electric signal. This signal is amplified by preamplifier (W) and is inputted in discriminator (X) (cf. FIG. 14). The discriminator (X) consists of a main amplifier, a filter, an envelope detector, an amplitude discriminator and various circuits for inhibition of noises and has functions of, if necessary, further amplifying the signal from the preamplifier, carrying out wave processings such as filtering and envelope detecting, and outputting oscillation pulse, event pulse, and envelope. In the discriminator, discrimination on generation of event is carried out based on AE signal and when event is generated, event signal is outputted during the period of duration of the event. This signal is inputted into dual counter and counted as one event. Accumulated number of the generated event is the event total. The event total increases after the start of agglomeration as shown in FIGS. 15, 17 and 19, though the degree of increase depends on amount of the bridging liquid added. Since the event total at the time when decrease of laser beam has reached 0 can be known, a time at which a certain period has elapsed after the laser beam attenuation has reached 0 is taken to be the final point of agglomeration and based thereon the electric power switch for driving the agitation blades is controlled using computer (V in FIG. 13).

(3) Event rate

The number obtained by cumulating in the dual counter the event signals which are outputted by discriminator in unit time, simply, the cumulated number of event signals in unit time is the event rate. Regarding the change of event rate with time, depending on amount of the bridging liquid, there are the case where the event rate gradually increases after starting of agglomeration and increases rapidly after a certain point and reaches a peak and then turns to decrease as seen in FIGS. 15 and 17 and the case where the event rate gradually increases after starting of agglomeration, decreases at a certain point, turns to increase, reaches a peak and then decreases as seen in FIG. 19. As can be seen in FIGS. 15 and 17, the event rate reaches a peak about , 2.5 minutes after the laser beam attenuation reaches 0 and then decreases. Therefore, the point at which a certain period has elapsed after the event rate has reached a peak is taken as the final point of agglomeration and based thereon the electric power switch for driving of the agitation blades is controlled using computer (V in FIG. 13). Furthermore, as can be seen from FIG. 19, the lowest descended point when the event rate decreases and again increases nearly corresponds to the point at which the laser beam attenuation reaches 0. Therefore, the point at which a certain period has elapsed from the lowest descending point is taken as the final point of agglomeration and based thereon the electric power switch for driving of agitation blades is controlled using the computer (V in FIG. 13).

(4) Oscillation rate

During the period of event signal being outputted, RF signal is converted to pulse (oscillation) in the zero cross comparator of the discriminator. ,, This pulse is inputted in dual counter and outputted as cumulation number per unit time also known as oscillation rate. As shown in FIGS. 16 and 18, the oscillation rate increases with elapsing of time, reaches a peak at a certain point and then decreases. The time at which it shows the peak is about 2.5 minutes after the laser beam attenuation reaches 0. Therefore, the point at which a certain period elaspses after the oscillation rate shows maximum value is taken as the final point of agglomeration and based thereon the electric power switch for driving the agitation blades is controlled using the computer (V in FIG. 13). Furthermore, as seen in FIG. 20, the oscillation rate increases very gently after agglomeration started, sharply decreases at a certain point, thereafter sharply increases to show maximum value and then, decreases. In FIG. 20, the point at which the oscillation shows the lowest descending point in the course of this elapsing of time nearly corresponds to the point at which laser beam attenuation reaches 0. Therefore, the point at which a certain period has elapsed after the point of the lowest descended point is taken as the final point of agglomeration and based thereon the electric power switch for driving the agitation blades is controlled using the computer (V in FIG. 13).

(5) Envelope

In the envelope detector of the discriminator (X), RF signal amplified by the main amplifier is subjected to half-wave rectification and is smoothened by allowing to have a time constant when falling. This output signal is called envelope. As seen in FIGS. 16 and 18, the envelope rapidly increases simultaneously with starting of agglomeration, then decreases, immediately thereafter begins to increase and gently decreases after reaching the maximum value. The point at which it reaches the maximum value is about 2.5 minutes after the laser beam attenuation reaches 0 in FIGS. 16 and 18. Therefore, the point at which a certain period has elapsed after the envelope reaches the maximum value is taken as the final point of agglomeration and based thereon the electric power switch for driving the agitation blades is controlled using the computer (V in FIG. 13). On the other hand, as shown in FIG. 20, the envelope rapidly increases simultaneously with the start of agglomeration, decreases, then gently increases, sharply decreases at a certain point, thereafter sharply increases and decreases after reaching the maximum value. The lowest descended point shown between the sharp decrease and subsequent sharp increase nearly corresponds to the point at which the laser beam attenuation reaches 0. Therefore, the point at which a certain period has elapsed after it has reached the lowest descended point is taken as the final point of agglomeration and based thereon the electric power switch for driving the agitation blades is controlled using the computer (V in FIG. 13).

(6) Average

In the averaging circuit in the discriminator, the signal which is outputted from the envelope detector is averaged and is outputted as a value of direct current (pulsating current). This output is the average. Change thereof with time differs depending on amount of the bridging liquid added as shown in FIGS. 15, 17 and 19. That is, in FIGS. 15 and 17, the average rapidly increases simultaneously with the start of agglomeration, then gently increases and gradually decreases after it reaches the maximum value. The point at which it shows the maximum value is about 2.5 minutes after the laser beam attenuation reaches 0 in FIGS. 15 and 17. Therefore, the point at which a certain period has elapsed after the average shows the maximum value is taken as the final point of agglomeration and based thereon the electric power switch for driving the agitation blades is controlled by the computer (V in FIG. 13). Furthermore, as shown in FIG. 19, the average sharply decreases at the point at which the laser beam attenuation rapidly decreases and the lowest descended point at which it again begins to increase nearly corresponds to the point at which laser beam attenuation reaches 0. Therefore, the point at which a certain period has elapsed from this lowest descended point is taken as the final point of agglomeration and based thereon the electric power switch for driving the agitation blades is controlled by the computer (V in FIG. 13).

(7) Energy rate

RF signal from the discriminator is squared up, amplified and treated for energy analysis and then it is converted to pulse of frequency proportional to energy by the energy processor. The energy analysis is carried out by processing the amplified input signal to convert into pulse of frequency proportional to energy. This converted pulse signal is sent to the dual counter and counted. The number of signals cumulated per unit time in the dual counter is the energy rate.

Change of the energy rate with time varies depending on amount of the bridging liquid added. The energy rate shown in FIGS. 16 and 18 continues to increase with elapsing of time, shows a maximum value at a certain point and then decreases. As seen in FIGS. 16 and 18, the point at which the energy rate shows the maximum value is about 2.5 minutes after the laser beam attenuation reaches 0. Therefore, the point at which a certain period has elapsed after the energy rate has shown the maximum value is taken as the final point of agglomeration and based thereon the electric power switch for driving the agitation blades is controlled using the computer (V in FIG. 13). On the other hand, as in FIG. 20, the energy rate very gently increases after the start of agglomeration, sharply decreases at a certain point, then again sharply increases and thereafter decreases. In the course of this change with time, the point at which the energy rate shows the lowest descended point nearly corresponds to the point at which the laser beam attenuation reaches 0 in FIG. 20. Therefore, the point at which a certain period has elapsed from the lowest descended point is taken as the final point of agglomeration and based thereon the electric power switch for driving the agitation blades is controlled using the computer (V in FIG. 13).

As explained above, AE shows characteristic changes with the progress of agglomeration. This characteristic changes are the very important information for agglomeration of fine particles.

In FIG. 1, a horizontal type cylindrical vessel is shown, but it is a matter of course that it may be of vertical, horizontal and slant types.

Mechanism of the agglomeration in liquid is not completely elucidated and it has been often experienced that a slight change of agglomeration conditions gives more influence than expected on the agglomeration products. For example, when the bridging liquid is supplied in an amount larger than the determined amount, even if the excess amount is slight, agglomeration time for obtaining spheres of the objective diameter becomes shorter than when it is added in the determined amount. When the agglomeration time is same, products having particle diameter larger than the desired diameter are obtained. Therefore, when agglomeration in liquid is carried out in industrial scale, accurate and sure production control is required for agglomeration conditions which govern commercial value of the products. Determination of the final point of agglomeration is considered to be one of the agglomeration conditions which govern the commercial value. Actually, this object can be more surely attained by carrying out computer control based on the following ways;

a) the change with time of laser beam attenuation.
b) the change with time of different AE data, namely, AE average, event total, event rate, oscillation rate, envelope, average, and energy rate or some of the AE.
c) combination of laser beam attenuation with each of AE data.

The present invention will be explained by the following nonlimiting examples.

Powder used: Commercially available zirconia powder (containing a partial stabilizer) having the following main properties.

Specific surface area—7.4 m$^2$/g (measured by BET method using model 220 manufactured by Micromeritics Co.)

True specific gravity—5.699 (measured by liquid phase displacement method using AUTO TRUE DENCER MAT-5000 manufactured by Seishin Kigyo Co.)

Average particle diameter (50% weight)—0.47 μm (measured by sedimentation method using SEDI-GRAPH 5000 D manufactured by Micromeritics Co.)

| Components | |
|---|---|
| ZrO$_2$ | 94.81 (wt %) |
| Y$_2$O$_3$ | 4.61 |
| CaO | 0.03 |
| Na$_2$O | 0.02 |
| ignition loss | 0.24 |

Agglomerating apparatus: The apparatus comprises a cylindrical agitating vessel of 3000 ml in internal volume and rotating blades. The agitating vessel is a horizontal type. The rotating blades are rotated by a motor and rotating speed can be changed.

Equipment for measuring the size of agglomeration product. The measurement was carried out by image analyzing method using LUZEX II manufactured by Nireco Co. Feret diameter was measured using this equipment to obtain diameter of spheres. Sphericity was shown by the two methods of ML/BD and PM2/A.

ML/BD and PM2/A are shape factors shown by the following formulas.

$$ML/BD = \frac{ML}{BD} \times 100$$

ML (maximum length): Maximum distance between two points on the periphery of a particle.

BD (breadth diameter): Minimum length of a particle on the line perpendicular to the maximum length. (FIG. 6)

$$PM2/A = \frac{1}{4\pi} \times \frac{PM^2}{A} \times 100$$

A (area): Projected area of a particle.
PM (peripheral length): Length of periphery of a particle.

Feret diameter is a distance between two parallel lines between which an image of a sphere projected on a plane is put and average value of the distances measured on a plurality of spheres is regarded to be a statistic average diameter.

Laser device used—He-Ne laser (manufactured by Nippon Electric Co., Ltd.) [(H) and (I) in FIGS. 1, 2 and 13]

AE sensor [(E) in FIGS. 1, 2 and 13] manufactured by NF Circuit Design Block Co.

AE tester [(F) in FIGS. 1, 2 and 13] manufactured by NF Circuit Design Block Co.

Wave memory device [(U) in FIGS. 1 and 13] manufactured by NF Circuit Design Block Co.

Material of pipe—Transparent flexible polyvinyl chloride pipe.

Other conditions:

An aliphatic hydrocarbon containing isoparaffin was used as a suspending medium.

EXAMPLE 1

Agglomeration in oil (using apparatus of FIG. 1 with addition of bridging liquid)
Amount of zirconia fine powder: 100 g
Suspending medium used: Aliphatic hydrocarbon containing isoparaffin.
Amount of suspending medium: 3300 ml
Amount of bridging liquid: 10.5 ml
Rotating speed of agitation blades: 1840 rpm
Agglomeration time: 44.18 minutes (Time from the start of agglomeration until 5 minutes elapsed after laser beam attenuation reached 0 in FIG. 7.)

The resulting agglomerate was sintered at 1450° C. for 2 hours and results of measurement on this sintered material are shown below.
Average particle diameter: 307 μm
Sphericity: 114 (ML/BD), 106 (PM2/A)
Density: 6.01 g/cm$^3$ Example 2

Agglomeration in oil (using apparatus of FIG. 1 with addition of bridging liquid)
Amount of zirconia fine powder: 100 g
Suspending medium used: Aliphatic hydrocarbon containing isoparaffin.
Amount of suspending medium: 3300 ml
Amount of bridging liquid: 9.5 ml
Rotating speed of agitation blades: 1840 rpm
Agglomeration time: 63.17 minutes (Time from the start of agglomeration until 5 minutes elapsed after laser beam attenuation reached 0 in FIG. 8.)

The resulting agglomerate was sintered at 1450° C. for 2 hours and results of measurement on this sintered material are shown below.
Average particle diameter: 293 μm
Sphericity: 113 (ML/BD), 106 (PM2/A)
Density: 6.05 g/cm3

EXAMPLE 3

Agglomeration in oil (using apparatus of FIG. 1 with addition of bridging liquid)
Amount of zirconia fine powder: 100 g
Suspending medium used: Aliphatic hydrocarbon containing isoparaffin.
Amount of suspending medium: 3300 ml
Amount of bridging liquid: 10.5 ml
Rotating speed of agitation blades: 1840 rpm
Agglomeration time: 45.35 minutes (Time from the start of agglomeration until 5 minutes elapsed from the descended point of AE average in FIG. 9.)

The resulting agglomerate was sintered at 1450° C. for 2 hours and results of measurement on this sintered material are shown below.
Average particle diameter: 301 μm
Sphericity: 114 (ML/BD), 107 (PM2/A)
Density: 6.03 g/cm3

EXAMPLE 4

Agglomeration in oil (using apparatus of FIG. 1 with addition of bridging liquid)
Amount of zirconia fine powder: 100 g
Suspending medium used: Aliphatic hydrocarbon containing isoparaffin.
Amount of suspending medium: 3300 ml
Amount of bridging liquid: 9.5 ml
Rotating speed of agitation blades: 1840 rpm
Agglomeration time: 63.35 minutes (Time from the start of agglomeration until 5 minutes elapsed from the descended point of AE average in FIG. 10.)

The resulting agglomerate was sintered at 1450° C. for 2 hours and results of measurement on this sintered material are shown below.
Average particle diameter: 294 μm
Sphericity: 114 (ML/BD), 107 (PM2/A)
Density: 6.05 g/cm$^3$

EXAMPLE 5

Agglomeration in oil (using apparatus of FIG. 1 with addition of bridging liquid)
Amount of zirconia fine powder: 100 g
Suspending medium used: aliphatic hydrocarbon containing isoparaffin.
Amount of suspending medium: 3300 ml
Amount of bridging liquid: 11.5 ml
Rotating speed of agitation blades: 1840 rpm
Agglomeration time: 30.50 minutes (Time from the start of agglomeration until 5 minutes elapsed after laser beam attenuation reached 0 in FIG. 11)

The resulting agglomerate was sintered at 1450° C. for 2 hours and results of measurement on this sintered material are shown below.
Average particle diameter: 355 μm
Sphericity: 107 (ML/BD), 107 (PM2/A)
Density: 5.98 g/cm$^3$

EXAMPLE 6

Agglomeration in water (using apparatus of FIG. 1)
100 g of zirconia fine powders were suspended in 3300 ml of pure water and the suspension was made hydrophobic with the given amount of sodium oleate and then the whole of the suspension was put in the agitating vessel shown in FIG. 1 and agglomeration was carried out under the following conditions.
Bridging liquid: Aliphatic hydrocarbon containing isoparaffin.
Amount of bridging liquid: 7.5 ml
Rotating speed of agitation blades: 1840 rpm
Agglomeration time: 64.12 minutes (Time from the start of agglomeration until 5 minutes elapsed from the descended point of AE average in FIG. 12)

The resulting agglomerate was sintered at 1450° C. for 2 hours and results of measurement on this sintered material are shown below.
Average particle diameter: 146 μm
Sphericity: 1.09 (ML/BD)
Density: 6.04 g/cm$^3$ AE average increased with progress of agglomeration and thereafter decreased as in the case of agglomeration in oil. On the other hand, laser beam attenuation gradually increased after the start of agglomeration and then sharply decreased to reach 0 in the case of agglomeration in oil while it once decreased after starting of agglomeration, then increased and thereafter again decreased in the case of agglomeration in water. It is considered that in the case of agglomeration in water there occurs the phenomenon that growth of aggregate occurs immediately after starting of agglomeration and the aggregate is broken at the initial stage of the agglomeration. The laser beam attenuation showed stable state at 0 in agglomeration in oil while it showed different state in agglomeration in water. In the case of FIG. 12, the final point of agglomeration was the point at which 5 minutes elapsed from the descended point.

EXAMPLE 7

Agglomeration in oil (using apparatuses of FIGS. 13 and 14 with addition of bridging liquid)
Amount of zirconia fine powder: 100 g
Suspending medium used: Aliphatic hydrocarbon containing isoparaffin.
Amount of suspending medium: 3200 ml
Amount of bridging liquid: 9.5 ml
Rotating speed of agitation blades: 1840 rpm
Agglomeration time: 50 minutes (Time from the start of agglomeration until 13 minutes elapsed after laser beam attenuation ($\alpha$) reached 0 in FIGS. 15 and 16.)
The resulting agglomerate was dried at 60° C. for 24 hours and results of measurement on this dried agglomerate are shown below.
Average particle diameter: 370 $\mu$m
Sphericity: 1.05 (ML/BD), 1.08 (PM2/A)
Density: 6.04 g/cm$^3$ (after sintered at 1450° C. for 2 hours)

EXAMPLE 8

Agglomeration in oil (using apparatus of FIGS. 13 and 14 with addition of bridging liquid)
Amount of zirconia fine powder: 100 g
Suspending medium used: Aliphatic hydrocarbon containing isoparaffin.
Amount of suspending medium: 3200 ml
Amount of bridging liquid: 10.5 ml
Rotating speed of agitation blades: 1840 rpm
Agglomeration time: 30 minutes (Time from the start of agglomeration until 2.5 minutes elapsed after laser beam attenuation ($\alpha$) reached 0 in FIGS. 17 and 18.)
The resulting agglomerate was dried at 60° C. for 24 hours and results of measurement on this dried agglomerate are shown below.
Average particle diameter: 389 $\mu$m
Sphericity: 1.09 (ML/BD), 1.07 (PM2/A)
Density: 6.05 g/cm$^3$ (after sintered at 1450° C. for 2 hours)

EXAMPLE 9

Agglomeration in oil (using apparatus of FIGS. 13 and 14 with addition of bridging liquid)
Amount of zirconia fine powder: 100 g
Suspending medium used: Aliphatic hydrocarbon containing isoparaffin.
Amount of suspending medium: 3300 ml
Amount of bridging liquid: 11.5 ml
Rotating speed of agitation blades: 1840 rpm
Agglomeration time: 22.8 minutes (Time from the start of agglomeration until 5 minutes elapsed after laser beam attenuation ($\alpha$) reached 0 in FIGS. 19 and 20.)
The resulting agglomerate was dried at 60° C for 24 hours and results of measurement on this dried agglomerate are shown below.
Average particle diameter: 531 $\mu$m
Sphericity : 1.06 (ML/BD), 1.08 (PM2/A)
Density: 5.96 g/cm$^3$(after sintered at 1450° C. for 2 hours)

As explained above, according to the present invention, agglomeration operation can be terminated at a proper final point of agglomeration and thus, the resulting particles can have exactly the desired average particle diameter.

We claim:

1. A method of agglomeration in liquid for preparing ceramic microspheres comprising:
   providing a vessel having at least one agitation blade mounted for rotation therewithin, and means defining a flow passage in communication with the interior of said vessel, said flow passage being transparent along at least a portion of the length thereof;
   suspending feedstock fine powder (a) in liquid (b) having non-affinity for the feedstock powder within said vessel;
   agitating the suspension by rotating said at least one agitation blade;
   circulating a part of the suspension through said flow passage;
   irradiating the suspension flowing through said transparent portion with light;
   measuring an intensity of transmitted light;
   calculating a final point of agglomeration based on a change in the intensity of transmitted light; and
   stopping the agglomeration.

2. A method as in claim 1, further comprising adding a bridging liquid, immiscible with the liquid (b) and having affinity for the feedstock fine powder (a), to the suspension.

3. A method of agglomeration in liquid for preparing ceramic microspheres comprising:
   providing a vessel having at least one agitation blade mounted for rotation therewithin;
   suspending feedstock fine powder (a) in liquid (b) having non-affinity for the feedstock powder within said vessel;
   agitating the suspension by rotating said at least one agitation blade;
   measuring acoustic emissions occurring in an agitating region within said vessel;
   calculating a final point of agglomeration based on changes in said acoustic emissions; and
   stopping the agglomeration.

4. A method as in claim 3, further comprising adding a bridging liquid, immiscible with the liquid (b) and having affinity for the feedstock fine powder (a), to the suspension.

5. A method of agglomeration in liquid for preparing ceramic microspheres comprising:
   providing a vessel having at least one agitation blade mounted for rotation therewithin, and means defining a flow passage in communication with the interior of said vessel, said flow passage being transparent along at least a portion of the length thereof;
   suspending feedstock fine powder (a) in liquid (b) having non-affinity for the feedstock powder within said vessel;
   agitating the suspension by rotating said at least one agitation blade;
   circulating a part of the suspension through said flow passage;
   irradiating the suspension flowing through said transparent portion with light;
   measuring an intensity of transmitted light;

measuring acoustic emissions occurring in an agitating region within said vessel;

calculating a final point of agglomeration based on both changes in the intensity of transmitted light and changes in acoustic emissions; and stopping the agglomeration.

6. An apparatus for agglomeration in liquid which comprises:

a vessel having at least one agitation blade mounted for rotation therewithin;

means defining a flow passage in communication with the interior of said vessel, said flow passage being transparent along at least a portion of the length thereof;

a light irradiator disposed on one side of said transparent portion;

a light receptor disposed on another side of said transparent portion for receiving light irradiated from the light irradiator and passing through said transparent portion; and a control mechanism for calculating a time for stopping rotation of said at least one agitation blade based on a change in intensity of light received by the light receptor and for stopping said rotation.

7. An apparatus as in claim 6, wherein said light irradiator comprises means for generating a laser beam.

8. An apparatus for agglomeration in liquid which comprises:

a cylindrical vessel having at least one agitation blade mounted for rotation therewithin;

means defining a recirculating flow passage in communication with the interior of said cylindrical vessel, said recirculating flow passage being transparent along at least a portion of the length thereof;

a light irradiator disposed on one side of said transparent portion;

a light receptor disposed on another side of said transparent portion for receiving light irradiated from the light irradiator and passing through said transparent portion; and a control mechanism for calculating a time for stopping rotation of said at least one agitation blade based on a change in intensity of light received by the light receptor and for stopping said rotation.

9. An apparatus for agglomeration in liquid which comprises:

a vessel having at lest one agitation blade mounted for rotation therewithin;

a device for detecting acoustic emissions generated within the vessel; and control means for calculating a time for stopping rotation of said at least one agitation blade based on a change in acoustic emissions detected by said device and for stopping rotation of said at least one blade.

10. An apparatus for agglomeration in liquid which comprises:

a vessel having at least one agitation blade mounted for rotation therewithin;

means defining a flow passage in communication with the interior of said vessel, said flow passage being transparent along at least a portion of the length thereof;

a light irradiator disposed on one side of said transparent portion;

a light receptor disposed on another side of said transparent portion for receiving light irradiated from the light irradiator and passing through said transparent portion;

means for detecting acoustic emissions generated within said vessel; and control means for calculating a time for stopping rotation of said at least one agitation blade based on both a change in intensity of light received by the light receptor and a change in acoustic emissions detected by the detecting means and for stopping rotation of said at least one agitation blade.

11. An apparatus as in claim 10, wherein said light irradiator comprises means for generating a laser beam.

* * * * *